US007832079B2

(12) United States Patent
Claus et al.

(10) Patent No.: US 7,832,079 B2
(45) Date of Patent: Nov. 16, 2010

(54) METHOD FOR PRODUCING A VACUUM INTERRUPTER

(75) Inventors: Oliver Claus, Ratingen (DE); Hartmut Mildes, Ratingen (DE); Till Rümenapp, Mettmann (DE)

(73) Assignee: ABB Technology AG, Zurich (CH)

( * ) Notice: Subject to any disclaimer, the term of this patent is extended or adjusted under 35 U.S.C. 154(b) by 871 days.

(21) Appl. No.: 11/630,804

(22) PCT Filed: Jun. 27, 2005

(86) PCT No.: PCT/EP2005/006885

§ 371 (c)(1), (2), (4) Date: Dec. 27, 2006

(87) PCT Pub. No.: WO2006/000442

PCT Pub. Date: Jan. 5, 2006

(65) Prior Publication Data

US 2007/0235415 A1 Oct. 11, 2007

(30) Foreign Application Priority Data

Jun. 28, 2004 (DE) ...................... 10 2004 031 089

(51) Int. Cl.
*H01S 4/00* (2006.01)

(52) U.S. Cl. .......................... 29/592.1; 29/593; 29/595; 29/825; 218/134

(58) Field of Classification Search ................ 29/592.1, 29/593, 595, 825; 218/134
See application file for complete search history.

(56) References Cited

U.S. PATENT DOCUMENTS 2,325,416 A * 7/1943 McMahon .................. 337/279
4,393,286 A * 7/1983 Takagi ........................ 218/139

* cited by examiner

*Primary Examiner*—C. J Arbes
(74) *Attorney, Agent, or Firm*—Paul Katterle; Michael M. Rickin; Michael C. Prewitt

(57) ABSTRACT

The invention relates to a vacuum interrupter chamber and a method for producing the same according to the preambles of patent claims 1 and 3. In order here to improve a vacuum interrupter chamber of this type and a method for producing the same and the subsequent casting to the extent that the advantages described above are utilized but the disadvantages described are avoided, it is proposed according to the invention that, in preparation for later casting, the vacuum interrupter chamber (1) is provided on the outer surface with a protective sheath (2) consisting of an elastic or elastomeric or plastomeric material, which is applied to the surface of the vacuum interrupter chamber without further expanding mechanical aids by heat shrinkage alone.

3 Claims, 2 Drawing Sheets

METHOD FOR PRODUCING A VACUUM INTERRUPTER

Figure 1:
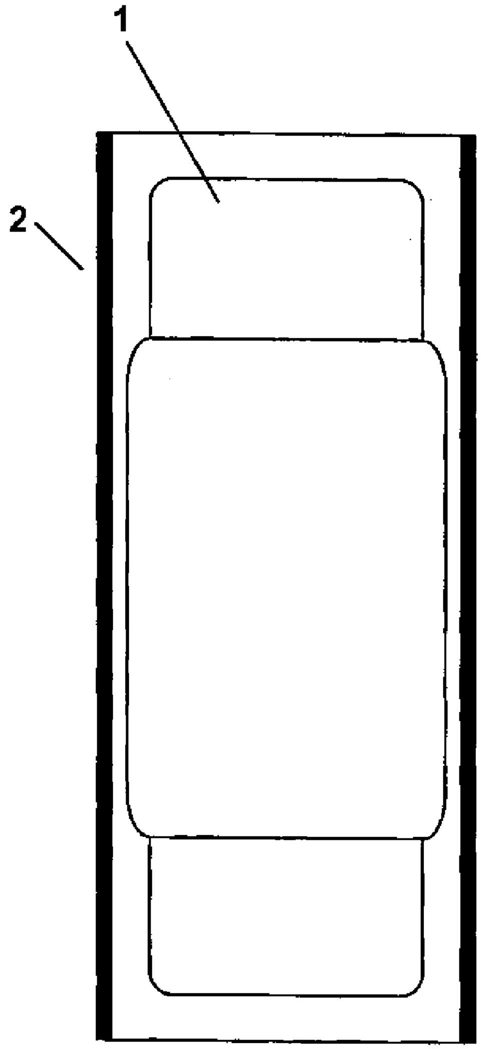

The invention concerns a vacuum interrupter chamber and a method for producing the same according to the preambles of patent claims 1 and 3.

The invention relates to what are known as resin-encapsulated pole pieces with a vacuum interrupter chamber, the pole pieces being used in low-, medium- and high-voltage technology. The vacuum interrupter chamber comprises a metal body which is evacuated inside and in which the switching contacts are located. Vacuum interrupter chambers of this type are usually embedded in epoxy resin or casting resin, or are enclosed by the same. It must be ensured here that the coefficients of expansion and other thermal parameters of the casting resin are different from those of the metal used for the vacuum interrupter chambers.

In operation, but also already in production, mechanical stresses may therefore occur during the encapsulation of such vacuum interrupter chambers as a result of different coefficients of thermal expansion, with the effect that intimate contact between the metal surface of the vacuum interrupter chamber and the encapsulation is not ensured. In order to avoid this, cushioning coatings of the vacuum interrupter chambers which consist of an elastic material and surround the vacuum interrupter chambers in an intimate manner are known in the prior art. In this case, the vacuum interrupter chamber with the coating or enclosure of elastic material already surrounding it is then cast in epoxy resin.

It is important here that the applied elastic material rests on the vacuum interrupter chamber in an intimate manner, that is to say without air bubbles, before it is encapsulated. Further requirements here are also that the system of layers remains stable during the casting.

To satisfy these requirements, it is known in the prior art to use tubes of elastic material which are made to expand by mechanical aids to the extent that they can be placed over the vacuum interrupter chamber. After removing the mechanical expanding means, the tube then comes to lie against the surface of the vacuum interrupter chamber. This generally means that the material comes to lie against the surface of the vacuum interrupter chamber with intimate contact, the elastic material in most cases remaining expanded even after it has come to lie against the surface of the vacuum interrupter chamber.

This means that, if the interrupter chamber were not placed there and the mechanical expanding means were removed, the diameter of the elastic tube that has relaxed as a result would be smaller than the outside diameter of the vacuum chamber. On the basis of these known parameters, already advantageously used in the prior art, the intimate contact with the surface that is described above occurs.

In the case of a vacuum interrupter chamber of the generic type described and in particular in the case of the production of such a described vacuum interrupter chamber for later encapsulation, the known parameters and measures of the method that are in themselves used with advantageous effect are expedient, but the production method is complex for such a vacuum interrupter chamber to be prepared for later encapsulation.

However, it is desired to continue with the arrangement of a corresponding tube, which on the one hand protects the interrupter chamber from damage and on the other hand brings about an increase in the insulating clearance and, furthermore, compensates for the different coefficients of expansion of the materials mentioned. Therefore, in the prior art, such a tube or protective sheath of the type described is applied at ambient temperature. However, it must be ensured here that the vacuum chamber together with the tube applied to it in this way is preheated to a temperature before it is encapsulated in casting resin. However, the use of such an elastic material that is cold when it is applied means that the heating during the further production process causes the permissible material temperature of the elastic material to be exceeded, thereby initiating premature aging. This kind of application increasingly causes the tube to be damaged before and during casting. This impairs the mechanical stability of the casting, and also the electrical parameters.

The invention is therefore based on the object of improving a vacuum interrupter chamber of this type and a method for producing the same and the subsequent casting to the extent that the advantages described above are utilized but the disadvantages described are avoided.

In the case of a vacuum interrupter chamber of the generic type, the set object is achieved according to the invention by the defining features of patent claim 1.

A further advantageous refinement is specified in claim 2.

With regard to a method for producing such a vacuum interrupter chamber and the subsequent encapsulation, the set object is achieved according to the invention by the defining features of patent claim 3.

Further advantageous refinements of the method according to the invention are specified in the other dependent claims.

The essence of the device-related invention concerning the vacuum interrupter chamber is that, in preparation for later casting, the vacuum interrupter chamber is still provided on the outer surface with a protective sheath consisting of an elastic, or elastomeric or plastomeric material, which is applied to the surface of the vacuum interrupter chamber without further mechanical aids by heat shrinkage. This achieves the advantage of a damping layer for the later casting of the vacuum interrupter chamber, that is to say this covering also ensures compensation for the different coefficients of thermal expansion and also satisfies the electrical and insulating requirements.

If appropriate, before this jacket or sheath is pushed over the vacuum interrupter chamber, the sheath is in this case also made to expand by mechanical means. When it is being pulled over the vacuum chamber, however, these means are no longer necessary, because in the cold state the heat shrinkage material initially remains in this stretched condition. However, it is important here that the sheath does not then relax immediately, as in the prior art, but initially remains in a stretched state until the heat shrinkage makes the tube come to lie against the surface of the vacuum interrupter chamber with intimate and firm contact.

In a further advantageous refinement, it is specified that the dimensioning of the tube or its final dimensioning once heat shrinkage has taken place is designed such that it comes to lie around the cylindrical outer surfaces with intimate contact, and also at the ends likewise comes to lie at least partially against the surface of the vacuum interrupter chamber around the edges.

With respect to a method for producing the same, a tube consisting of heat shrinkage material which has a greater circumference in its state before it is pulled onto the vacuum interrupter chamber than that of the interrupter chamber is pulled over the same and positioned there, and is subsequently shrink-fitted onto the surface of the vacuum interrupter chamber by a heat shrinkage process. Therefore, further mechanical means are no longer necessary, as customary in the prior art, for applying the tube to the vacuum interrupter chamber. In addition, the tube can consequently be easily pulled over the vacuum interrupter chamber and then, by means of a simple method step, be brought quickly and very efficiently into similarly close and intimate contact with the surface of the vacuum interrupter chamber.

This is followed by casting in epoxy resin. It is of particular advantage here that the heat shrinkage material is a material which is stable in its consistency at different temperatures as compared to the materials previously used in the prior art, which consisted of rubber or silicone rubber or the like. The subsequent casting in epoxy resin likewise takes place at a temperature of at least 130 degrees. By contrast with materials from the prior art, however, the heat shrinkage tube according to the invention remains stable from technical aspects of its material and in its consistency and the encapsulation as such does not cause aging of the material.

The invention is schematically represented in the drawing only to the extent necessary and is described in more detail below.

FIG. 1: For shrink-fitting a heat shrinkage tube 2 onto a vacuum chamber 1, the expanded tube is pulled over the chamber in the way described. However, the expanding of the tube may take place beforehand and, as a result, mechanical means that are otherwise necessary when pulling the heat shrinkage tube onto the vacuum chamber are no longer necessary.

This is followed by thermal treatment at 130 degrees Celsius, so that the tube shrinks onto the vacuum interrupter chamber. The tube is of such a nature that it assumes the outer contour of the chamber and therefore smoothes the surface. A dielectrically sealed joint with an increase in the insulating clearance is produced. This helps to optimize the form of construction of vacuum interrupter chambers and to minimize the production costs. Suitable characteristic material values of the tube avoid impermissible thermal loading before and during casting.

The form of the expanded tube is conducive to automation of the production process to a much greater extent than was possible with known methods.

Figure 2:
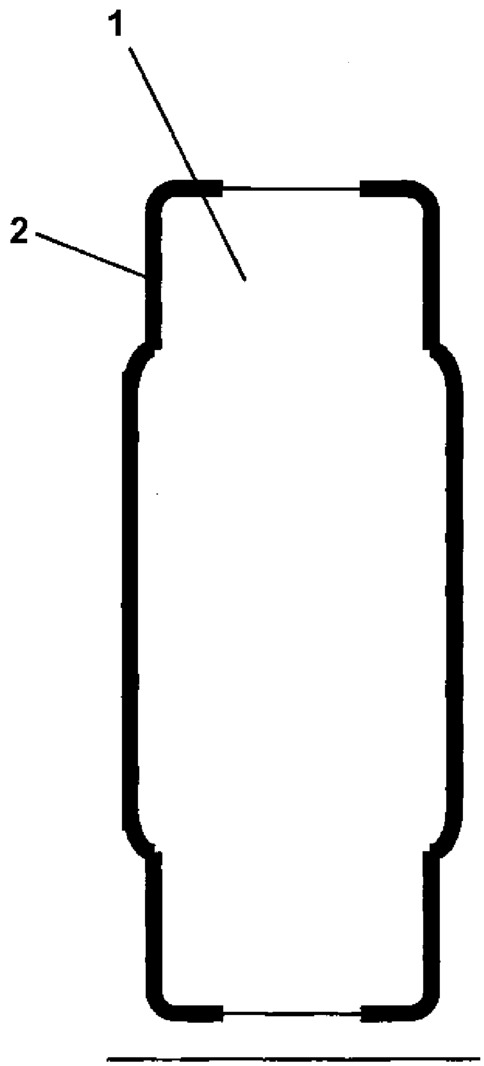

FIG. 2 shows how, after the heat treatment, the shrinkage tube comes to lie around the vacuum interrupter chamber.

The vacuum interrupter chamber created in this way and firmly encased in this way by the shrink-fitted heat shrinkage tube is then surrounded by an epoxy resin casting, or embedded in such, which is not represented any further here. The casting in this case lies directly against the outer skin of the heat shrinkage tube.

The invention claimed is:

1. A method for producing a vacuum interrupter with a resin-encapsulated pole piece comprising, pulling a tube made of heat shrinkable material over a vacuum interrupter chamber, said tubing having a greater circumference before it is pulled onto the vacuum interrupter chamber than that of the interrupter chamber, shrink-fitting said tube onto the surface of the vacuum interrupter chamber by a heat shrinkage process and after shrink-fitting said tube, casting said tube and said vacuum interruptor chamber in an epoxy resin.

2. The method as claimed in claim 1, wherein the heat shrinkage material of the tube is a material which is stable in its consistency at different temperatures.

3. The method as claimed in one of claims 1, wherein the subsequent epoxy resin casting takes place at a temperature of at least 130 degrees.

* * * * *